May 9, 1933.  A. C. KELLE  1,907,827

CASING AND INSULATING LINING THEREFOR

Filed Sept. 25, 1929    2 Sheets-Sheet 1

Inventor.
Arthur C. Kelle
by
atty

May 9, 1933. A. C. KELLE 1,907,827
CASING AND INSULATING LINING THEREFOR
Filed Sept. 25, 1929 2 Sheets-Sheet 2
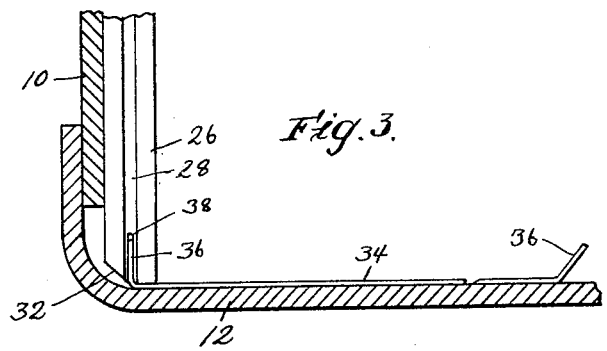
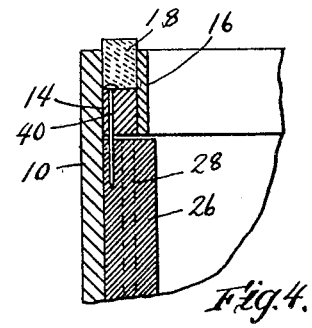
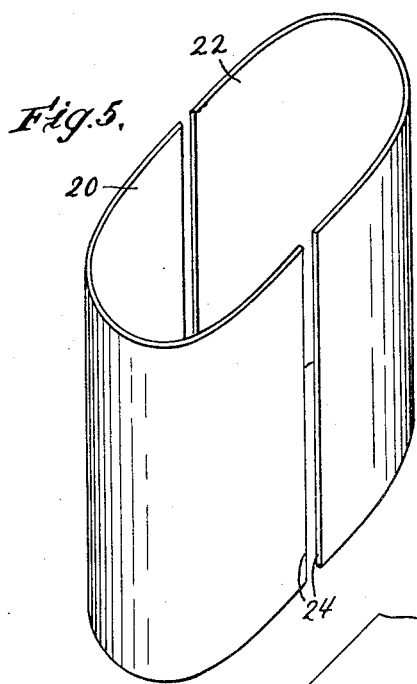
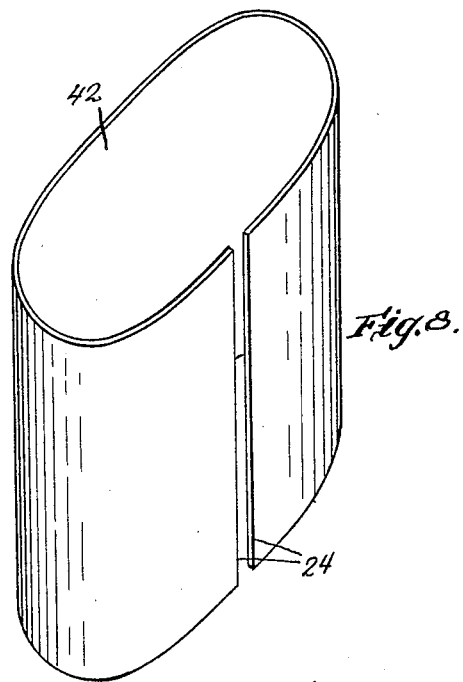
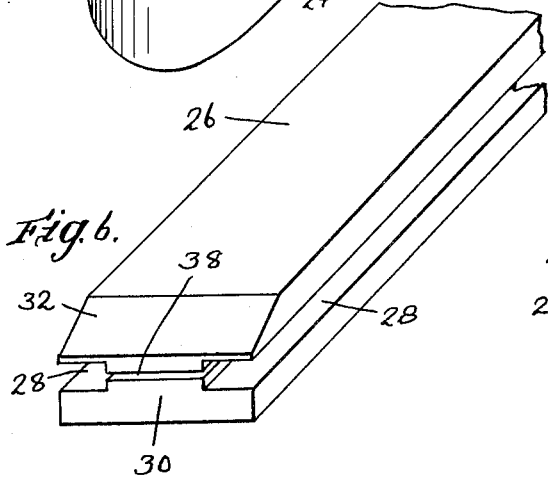
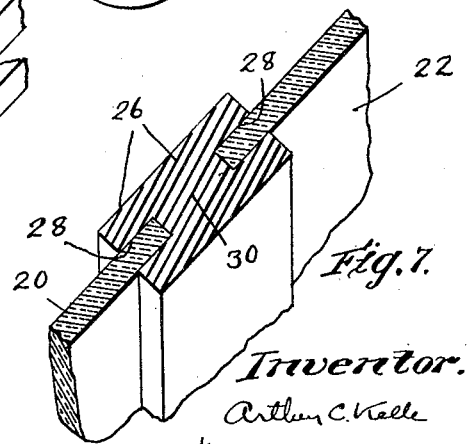
Inventor.
Arthur C. Kelle Patented May 9, 1933

1,907,827

UNITED STATES PATENT OFFICE

ARTHUR C. KELLE, OF MILTON, MASSACHUSETTS, ASSIGNOR TO CONDIT ELECTRICAL MANUFACTURING CORPORATION, OF SOUTH BOSTON, MASSACHUSETTS, A CORPORATION OF MASSACHUSETTS

CASING AND INSULATING LINING THEREFOR

Application filed September 25, 1929. Serial No. 394,994.

This invention relates to oil immersed electric apparatus and particularly to insulating linings which are interposed between the apparatus and the metal enclosing casing or tank to insulate the apparatus from the casing.

Oil immersed electric switches in particular have such linings to prevent the circuit interrupting arc from coming in contact with the metal wall of the oil receptacle in which the circuit interrupting arc takes place. The oil containing receptacles for some pieces of apparatus, and particularly for switches, are oval in cross section and furthermore are provided with an instanding annular flange at the open top which flange carries a packing ring that engages the cover of the receptacle, or the frame of the switch, to prevent escape of oil out of the top of the receptacle upon circuit interruption under heavy loads. With an oval tank, the insulating lining is oval to conform with the shape of the tank. Due to the instanding packing flange at the top of the tank the lining, if one piece, must be made small enough to be inserted into the tank and consequently is within the flange and consequently is too small and is spaced away from the side of the tank a greater distance than is desirable.

It is an object of the present invention to provide an oval tank and especially a tank having an instanding flange at the top with a lining which is made sectional, or at least is not continuous, and simple and effective means to spread the lining when it is within the tank and to hold it securely in such a condition.

A further object is the provision of a sectional tank lining having confronting ends with lining securing means interposed between the ends of the lining which serve to hold the lining sections in position in the tank and also to overlie the space between the confronting ends of the lining sections and provide a barrier between the metal tank and the oil-containing space within the lining.

A further object is generally to improve the construction of tanks and insulating linings therefor.

Fig. 3 is an enlarged sectional detail taken through the bottom of the tank at one of the spreader members for the lining.

Fig. 4 is an enlarged sectional detail taken along the top of the tank along line 4—4 of Fig. 1, and illustrating particularly the construction of the packing flange and the method of securing the top of the spreader member in position.

Fig. 5 is a perspective view of the sectional tank lining.

Fig. 6 is a perspective view of one of the spreader members.

Fig. 7 is a sectional detail showing the confronting ends of the lining section as in the slots of the spreader member.

Fig. 8 is a perspective view of a modified construction in which the tank lining is in one piece.

Figure 1:
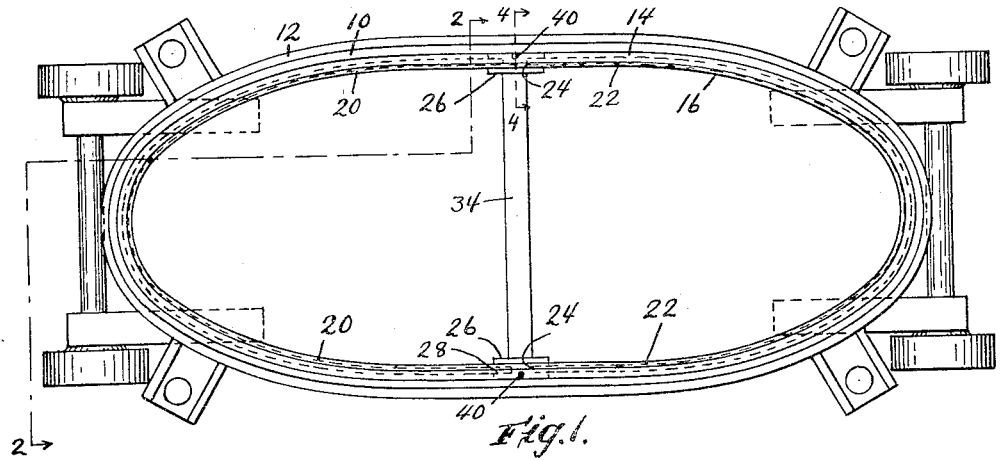
Fig. 1 is a plan view of an oval tank and a lining embodying the present invention.
Figure 2:
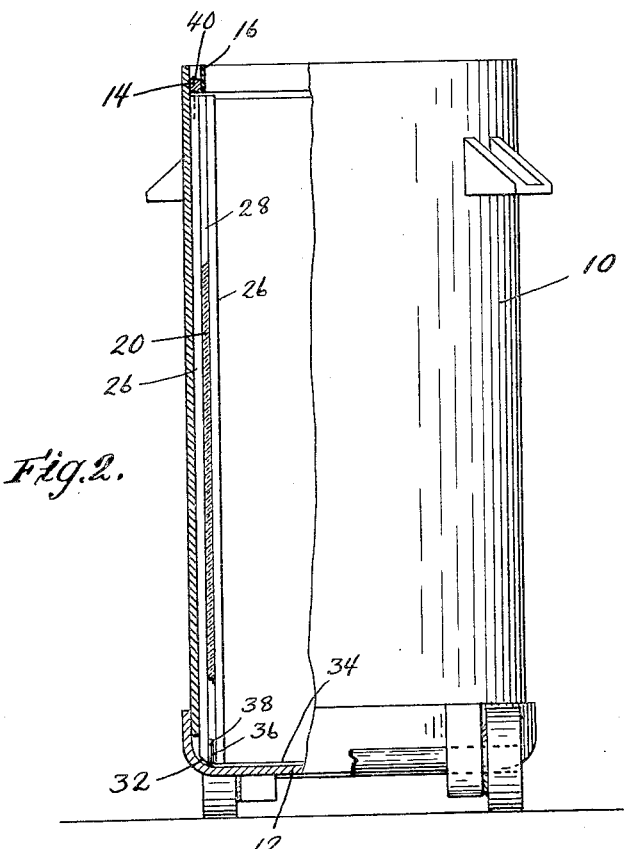
Fig. 2 is an elevation of the tank of Fig. 1 partly in section, the section being taken along line 2—2 of Fig. 1.

The oil containing tank or receptacle here shown consists of an upright shell 10 which constitutes the side wall of the receptacle and a bottom wall 12 which has an annular upturned flange that overlies the bottom edge of the shell 10 and is sealed thereto in an oil tight manner. The tank here shown is oval or elliptical in cross section as is illustrated particularly in Fig. 1. The tank is provided with an instanding annular flange at its upper open end. Said flange consists of a metal bar 14 of suitable dimensions which is formed to oval shape and secured preferably by welding to the inner face of the shell 10 below the top thereof. An oval band 16 is fixed to said bar 14 and upstands thereabove and cooperates with the shell to form an annular groove which is open at the top and in which a ring 18 of suitable packing material is received by which the joint between the oil receptacle and its cover, not shown, may be sealed.

The receptacle is provided with a tank lining which is located within the shell 10 closely adjacent the inner face thereof and under the bar 14. The lining is relatively thick and is somewhat flexible. The lining may be composed of an impregnated insulating paper or paper board, although the particular composition thereof is not herein of importance. In accordance with this invention, the lining preferably is composed of two complemental sections 20 and 22, see especially Fig. 5. Said sections are U-shaped in plan view and when assembled with their straight vertical edges 24 in juxtaposed position constitute an oval or elliptical lining having dimensions which closely conform to the interior of the oil tank. Since the lining is sectional, each section can be located in position in the oil tank within the annular flange thereof and located in place under said flange, the sections being sufficiently flexible to permit the free ends thereof to be drawn toward each other for this purpose. When the lining sections are in position within the tank, their confronting edges 24 are spaced apart. Spreader members are located in the spaces between the confronting ends of the sections to hold the sections in position and also to cover the side wall of the tank which otherwise would be exposed at such spaces. There is a spreader member for each space between the sections. This spreader member consists essentially of an insulating bar 26 which preferably is of wood and is long enough to be at least coextensive with the height of the lining and preferably to extend somewhat both thereabove and therebelow. The spreader member is provided with vertical grooves or slots 28 in its opposite side faces which slots are separated by the body 30 of the bar. The slots are adapted to receive the confronting edges 24 of the lining sections, the bars being slid vertically downward between the sections in inserting them in place. In the act of inserting the bars they serve to force the sections outwardly and against the ends of the tank so that the lining sections are held against displacement when the spreader bars are in position. The spreader bars overlie the confronting ends of the sections so as to provide in effect, in cooperation with the linings, a continuous inner insulating surface through which there is no opening for an arc to pass from the interior of the lining to the tank wall. The outer bottom edges of the spreader bars are chamfered off as at 32 so that the bars thus rest on the bottom of the tank, and clear the curve at the inner edge thereof. The spreader members, and consequently the lining sections, are held in position against inward movement by a thin metal strap 34 which is disposed on the bottom wall of the tank transversely thereof and under the spreader members. Said strap has upstanding resilient ends 36 which normally are outwardly inclined. Said ends are received within vertical slots 38 at the bottom ends of the spreader members and thus hold the spreader members in spaced relation. Since the slots 38 are vertical the resilient ends 36 of the strap are also caused to be vertical and they thus tend to flex outwardly and thus urge the spreader members against opposite portions of the side wall of the tank. The upper ends of the spreader members are disposed immediately under the bar 14, as is clearly shown in Fig. 4, and the ends are secured in such relation by pins 40 which are passed downwardly through said bar and into the upper ends of the spreader members. As thus arranged, the lining sections are free to conform to and are held against outward movement by the side wall of the tank and against inward movement by the spreader members. The flange 14 overlies the tops of the spreader members and the lining sections so that they cannot float in the oil in which they are immersed. It is possible to make a tank lining which is in one piece as the lining 42, having confronting free ends 24 as shown in Fig. 8. This lining can be inserted in the oil tank here shown and held in place by one spreader disposed between the free ends. Such construction, however, is not so desirable or so effective as the construction above explained.

I claim:

1. The combination of an elliptical tank having an instanding flange surrounding its open top and a flexible insulating lining of elliptical shape received within said tank under said flange and having confronting vertical ends, and an insulating spreader member located between said confronting ends beneath said flange and having slots at the opposed faces in which said ends are received, said spreader member serving to hold said ends apart.

2. The combination of an elliptical tank having an instanding flange surrounding its open top and a flexible insulating lining of elliptical shape received within said tank under said flange and having confronting vertical ends, and an insulating spreader member located between said confronting ends beneath said flange and having slots at the opposed faces in which said ends are received, said spreader member serving to hold said ends apart, and means to secure said spreader member to said tank.

3. The combination of an elliptical tank having an instanding flange surrounding its open top and a flexible elliptical lining received within said tank under said flange and conformed with the interior thereof and having confronting vertical ends which are located at one of the broad faces of the tank, and an insulating spreader member comprising a bar which is located between said confronting ends beneath said flange and has opposed vertical slots in which said ends are received, said spreader member serving to expand said lining against the opposite ends of the tank.

4. The combination of an elliptical tank having an instanding flange surrounding its open top and a flexible insulating elliptical lining located within said tank under said flange closely adjacent the inner face of the side wall thereof, said lining consisting of two complemental sections which have spaced confronting ends, and insulating spreader members located between said confronting ends beneath said flange and having opposed grooves therein in which said ends are received.

5. The combination of an elliptical tank and a flexible insulating elliptical lining located within said tank closely adjacent the inner face of the side wall thereof and free to conform to the contour of said side wall, said lining consisting of two complemental sections which have spaced confronting ends, insulating spreader members located between said confronting ends and having opposed grooves therein in which said ends are received, and means securing said spreader members to said tank.

6. The combination of an elliptical tank and a flexible elliptical insulating lining located within said tank adjacent the inner face of the side wall thereof and free to conform to the contour of said side wall, said lining composed of two complemental generally U-shaped sections having free confronting vertical ends which are located adjacent the two broad sides of the tank, and insulating spreader bars vertically located between said confronting ends and having opposed grooves in which said confronting ends are received.

7. The combination of an elliptical tank and a flexible elliptical insulating lining located within said tank adjacent the inner face of the side wall thereof and free to conform to the contour of said side wall, said lining composed of two complemental generally U-shaped sections having free confronting vertical ends which are located adjacent the two broad sides of the tank, insulating spreader bars vertically located between said confronting ends and having opposed grooves in which said confronting ends are received, and means to hold said spreader bars and linings against movement toward each other.

8. The combination of an elliptical tank and a flexible elliptical insulating lining located within said tank and free to conform to the contour of the side wall thereof, said lining consisting of two complemental U-shaped sections having generally parallel free ends which confront and are spaced from each other, and spreader members located between said confronting ends having means engageable with said ends on opposite sides thereof, said spreader members constituting means to urge said sections apart and into the opposite ends of the tank.

9. The combination of an elliptical tank and a flexible elliptical insulating lining located within said tank and free to comform to the contour of the side wall thereof, said lining consisting of two complemental U-shaped sections having generally parallel free ends which confront and are spaced from each other, and spreader members located between said confronting ends having means engageable with said ends on opposite sides thereof, said spreader members constituting means to urge said sections apart and into the opposite ends of the tank, and means securing said spreader members to said tank.

10. The combination of an elliptical tank and a flexible elliptical insulating lining located within said tank consisting of two complemental U-shaped sections having generally parallel free ends which confront and are spaced from each other, and spreader members located between said confronting ends having means engageable with said ends on opposite sides thereof, said spreader members constituting means to urge said sections apart and into the opposite ends of the tank, and means securing said spreader members to said tank including resilient means connecting said spreader members and urging them away from each other.

11. The combination of an elliptical tank having an instanding annular flange surrounding its open top, a flexible elliptical lining received within said tank under said flange and having confronting free ends, and an insulating member located between and overlying said ends beneath said flange.

12. The combination of an elliptical tank having an instanding annular flange surrounding its open top, a flexible elliptical lining received within said tank under said flange and having confronting free ends, an insulating member located between and overlying said ends beneath said flange, and means securing said insulating member to said tank.

13. The combination of a tank and an insulating lining therefor having confronting free ends, an insulating member located between and connecting said free ends, and resilient means urging said insulating member against the wall of said tank.

14. The combination of an elliptical tank and an elliptical insulating lining located within said tank adjacent the side wall thereof and composed of complemental sections having opposed free ends, opposed insulating spreader members located between said free ends, and a strip extended between the bottom ends of said spreader members having upturned resilient ends which are in engagement with the bottom ends of said spreader members and which force them apart.

15. The combination of an elliptical tank and an elliptical insulating lining located within said tank adjacent the side wall thereof and composed of complemental sections having opposed free ends, opposed insulating spreader members located between said free ends, and a strip extended between the bottom ends of said spreader members having upturned resilient ends which are in engagement with the bottom ends of said spreader members and which force them apart, said tank having an instanding annular flange which surrounds its open top and which overlies the tops of said spreader members, and means securing said spreader members to said flange.

16. The combination of an elliptical tank and an elliptical insulating lining located within said tank adjacent the side wall thereof and composed of complemental sections having opposed free ends, opposed insulating spreader members located between said free ends, and a strip extended between the bottom end of said spreader members having upturned resilient ends which are in engagement with the bottom ends of said spreader members and which force them apart, said tank having an instanding annular flange which surrounds its open top and which overlies the tops of said spreader members, and means securing said spreader members to said flange including pins which are passed downwardly through said flange and into the tops of said spreader members.

17. The combination of a tank and an insulating lining therefor located within said tank adjacent the side wall thereof and consisting of two complemental sections having confronting free ends, opposed spreader members located between said free ends, and a strap extended between the bottom ends of said spreader members having upwardly and outwardly inclined resilient free ends which are located in vertical slots in the bottom ends of said spreader members and constitute means to urge said spreader members apart.

18. The combination of a tank and an insulating lining therefor located within the tank adjacent the inner face of the side wall thereof and having confronting free ends, an insulating spreader member located between said free ends and in engagement therewith, and spring means engageable with the lower ends of said spreader member and acting to force it against the side wall of said tank.

In testimony whereof, I have signed my name to this specification.

ARTHUR C. KELLE.